United States Patent
Raike

(10) Patent No.: US 8,332,633 B2
(45) Date of Patent: Dec. 11, 2012

(54) ENCRYPTION PROCESSING FOR STREAMING MEDIA

(75) Inventor: William Michael Raike, Auckland (NZ)

(73) Assignee: General Instrument Corporation, Horsham, PA (US)

( * ) Notice: Subject to any disclaimer, the term of this patent is extended or adjusted under 35 U.S.C. 154(b) by 129 days.

(21) Appl. No.: 12/024,614

(22) Filed: Feb. 1, 2008

(65) Prior Publication Data

US 2008/0267409 A1      Oct. 30, 2008

Related U.S. Application Data

(63) Continuation of application No. 09/912,403, filed on Jul. 26, 2001, now abandoned.

(60) Provisional application No. 60/222,945, filed on Aug. 4, 2000.

(51) Int. Cl.
*H04L 29/06* (2006.01)
(52) U.S. Cl. ............ 713/160; 713/178; 726/13; 726/30; 726/32; 380/277; 380/278; 380/280
(58) Field of Classification Search .................. 380/241, 380/45, 210, 239, 277, 278, 280; 713/160, 713/178; 725/63, 67–68, 86; 726/13, 30, 726/32
See application file for complete search history.

(56) References Cited

U.S. PATENT DOCUMENTS

| | | | |
|---|---|---|---|
| 5,029,207 A | 7/1991 | Gammie | |
| 5,237,610 A | 8/1993 | Gammie et al. | |
| 5,420,866 A | 5/1995 | Wasilewski | |
| 5,515,437 A | 5/1996 | Katta et al. | |
| 5,768,381 A | 6/1998 | Hawthorne | |
| 5,963,909 A | 10/1999 | Warren et al. | |
| 6,084,877 A | 7/2000 | Egbert et al. | |
| 6,212,633 B1 | 4/2001 | Levy et al. | |
| 6,288,739 B1 | 9/2001 | Hales et al. | |
| 6,591,250 B1 | 7/2003 | Johnson et al. | |
| 6,636,966 B1 * | 10/2003 | Lee et al. ...................... 713/165 |

(Continued)

FOREIGN PATENT DOCUMENTS

EP      0689316      12/1995

(Continued)

OTHER PUBLICATIONS

Office Action, Japanese App. No. 2001-226117 (Foreign Text & English Translation), Mar. 30, 2011.

(Continued)

*Primary Examiner* — Thanhnga Truong
(74) *Attorney, Agent, or Firm* — Stewart M. Wiener

(57) ABSTRACT

A method of securing transmission of streaming media by encrypting each packet in the stream with a packet key using a fast encryption algorithm. The packet key is a hash of the packet tag value and a closed key which is unique for each stream. The closed key is itself encrypted by the sender and passed to the recipient using a public key encryption system. The encrypted closed key (open key) may conveniently be inserted into the stream header. All of the packets in the stream are encrypted, but only the data pay load of each packet is encrypted. It is computationally infeasible, without knowing the recipient's private key to calculate the closed key based upon knowledge of publicly accessible information such as the recipient's public key, the open key, the encrypted stream data or the packet tag values.

13 Claims, 1 Drawing Sheet

U.S. PATENT DOCUMENTS

| | | | |
|---|---|---|---|
| 6,735,313 B1 | 5/2004 | Bleichenbacher et al. | |
| 6,760,441 B1 * | 7/2004 | Ellison et al. | 380/45 |
| 7,191,335 B1 * | 3/2007 | Maillard | 713/176 |
| 7,457,414 B1 * | 11/2008 | Kahn et al. | 380/201 |
| 2002/0083319 A1 | 6/2002 | Ishiguro et al. | |

FOREIGN PATENT DOCUMENTS

| | | |
|---|---|---|
| EP | 0872977 | 10/1998 |
| JP | 10-032567 A | 2/1998 |
| JP | 10-126406 A | 5/1998 |
| JP | 11-327437 A | 11/1999 |
| JP | 2000-196586 A | 7/2000 |

OTHER PUBLICATIONS

Shin Ichimatsu, "Research on Data Protection and Encryption", Japan, Nippon Keizai Shinbun, Inc.; Jul. 29, 1983; vol. 1, 1st printing, pp. 59-65.

Eiji Okamoto, "Cryptographic Theory Course", Japan Kyoritsu Shuppan Co., Ltd., Oct. 1, 1996; vol. 1, 3rd printing; pp. 138-143.

Alattar et al. "Improved Selective Encryption Techniques for Secure Transmission of MPEG Video bit-streams." *IEEE*. pp. 256-260 (1999).

Sallings. "Cryptography and Network Security." Prentice Hall, $2^{nd}$ Edition. pp. 165-167 (1998).

Alattar A M et al: "Evaluation of selective encryption techniques for secure transmission of MPEG-compressed bit-streams" Circuits and Systems, 1999. ISCAS '99. Proceedings of the 1999 IEEE International Symposium on Orlando, FL, USA May 30-June 2, 1999, Piscataway, NJ, USA,IEEE, US, May 30, 1999, pp. 340-343, XP010341246 ISBN: 0-7803-5471-0.

Alattar A M et al: "Improved selective encryption techniques for secure transmission of MPEG video bit-streams" Image Processing, 1999. ICIP 99. Proceedings. 1999 International Conference on Kobe, Japan Oct. 24-28, 1999, Piscataway, NJ, USA,IEEE, US, Oct. 24, 1999, pp. 256-260, XP010368705 ISBN: 0-7803-5467-2.

European Search Report for EP01306389, dated Jun. 25, 2003.

Japanese Office Action for Japanese Application No. 2001-226117, dated Mar. 30, 2011. (foreign text and translation).

Japanese Patent Publication No. 10-32567, dated Feb. 3, 1998 (foreign text and English abstract).

Japanese Patent Publication No. 2000-196586, dated Jul. 14, 2000 (foreign text and English abstract).

Japanese Patent Publication No. 11-327437, dated Nov. 26, 1999 (foreign text and English abstract).

Japanese Patent Publication No. 10-126406, dated May 15, 1998 (foreign text and English abstract).

Shin Ichimatsu Editor, "Research on Data Protection and Encryption", Japan, Nippon Keizai Shinbun Inc., Jul. 29, 1983, vol. 1, 1st printing, p. 59-65. (foreign text).

Eiji Okamoto, "Cryptographic Theory Course", Japan, Kyoritsu Shuppan Co. Ltd., Oct. 1, 1996, vol. 1, 3rd Printing, p. 138-143. (foreign text).

* cited by examiner

ENCRYPTION PROCESSING FOR STREAMING MEDIA

RELATED APPLICATIONS

This application is a continuation of and claims priority from, under 35 U.S.C. §120, U.S. application Ser. No. 09/912,403, filed Jul. 26, 2001 which is hereby incorporated by reference. U.S. application Ser. No. 09/912,403 also claimed priority under 35 U.S.C. §119(e) from Provisional Application No. 60/222,945 filed Aug. 4, 2000, which is hereby incorporated by reference. U.S. application Ser. No. 09/912,403 also claimed priority under 35 U.S.C. §119(a)-(d) from New Zealand Application No. 506002 filed Jul. 26, 2000, which is hereby incorporated by reference.

BACKGROUND

1. Field of the Invention

This invention relates to encryption techniques for streaming media.

2. Description of the Related Technology

Digital content such as video, audio and multimedia digital files are usually quite large and there may be a long transmission delay before a recipient is able to see or hear the content of such files when transmitted to him, particularly over the internet where bandwidth at some point in the transmission channel may be limited. The technique of streaming media files addresses this problem and allows the recipient to commence viewing video or listening to audio long before the media file has been completely received by him. A video may be displayed and audio played as soon as there is sufficient data in the buffer of the recipient station.

As with other digital files there are a number of applications where it is highly desirable for a streaming media file to be encrypted. Usually the content will be subject to copyright and encryption will be desired to supplement the legal protection. The encryption of streaming media poses additional problems to those encountered when a complete file is encrypted, transmitted and decrypted before use by the recipient. In practice most digital data transmission over a distance is conducted using packet technology. Therefore the encryption of streaming media requires packet by packet encryption and decryption if the advantages of streaming are to be preserved.

SUMMARY OF CERTAIN INVENTIVE ASPECTS

One aspect of the present invention provides fast and secure encryption for streaming media.

Another aspect of the invention provides a method for securely transmitting streamed media consisting of a stream header and a series of data packets between a sender and a recipient, wherein the method comprises:

generating a random base key, encrypting said base key to create an open key, transmitting said open key to said recipient, encrypting each packet of the data in the stream by:

(a) assigning a tag value to each packet if no tag value already exists, (b) creating a packet key by computing a secure hash of said base key and the tag value or the assigned tag value of the packet, (c) encrypting the data in the packet using said packet key, and (d) adding said tag value to the corresponding encrypted packet data and inserting the packet so processed into the packet stream, transmitting the encrypted packet stream to said recipient, at the recipients station receiving said open key and the encrypted packet stream, decrypting said open key to derive the base key, decrypting each received encrypted packet in the stream by:

(a) extracting the tag value from each packet, (b) recreating said packet key by computing a secure hash of the base key and the packet's tag value, (c) decrypting the packet data using said packet key, (d) and storing or outputting the decrypted packet data in a form suitable for playing the streamed media.

DESCRIPTION OF CERTAIN INVENTIVE EMBODIMENTS

Figure 1:
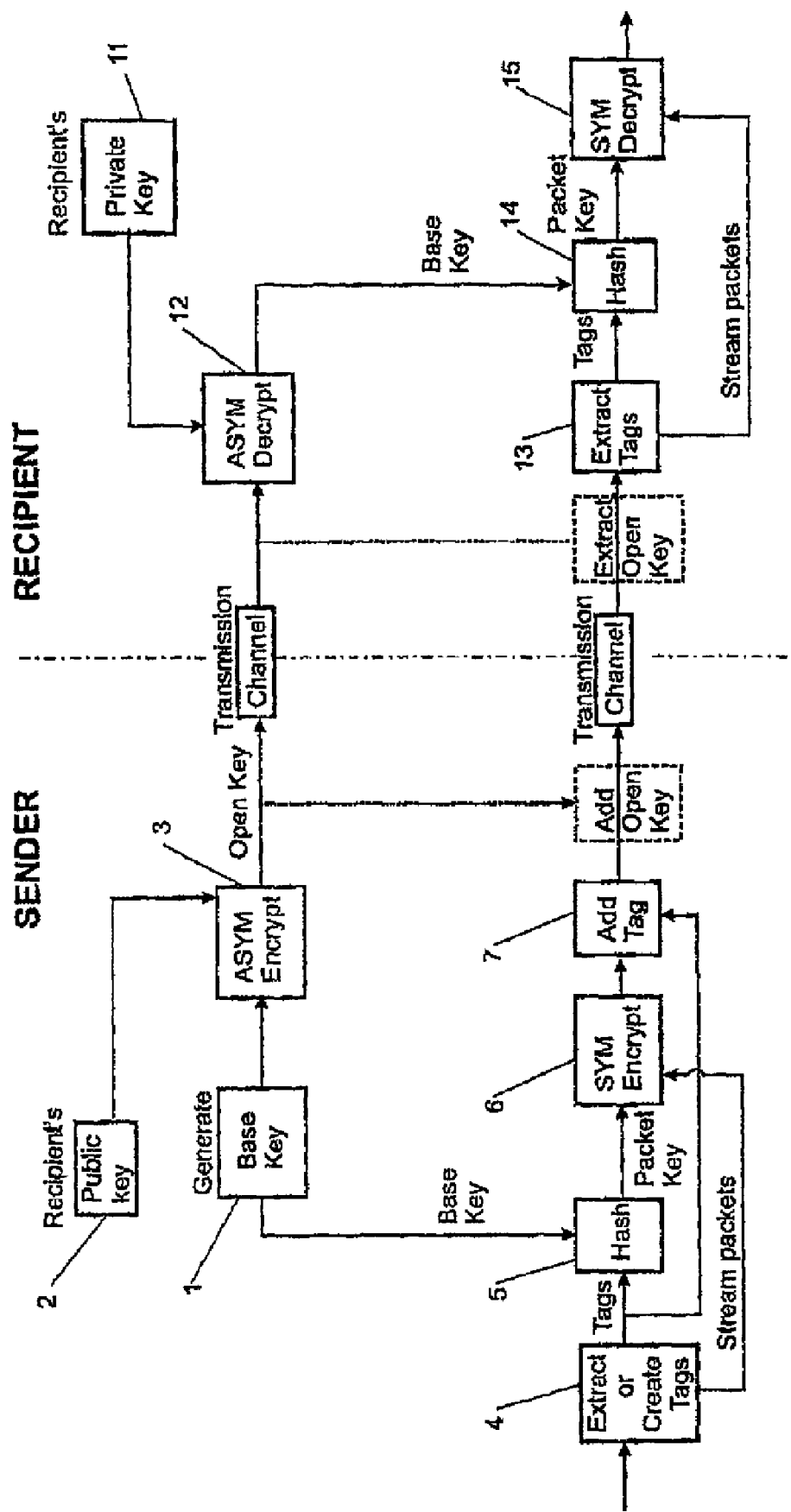
FIG. 1 is a block diagram showing the essential encryption and decryption process steps according to one embodiment of the present invention.

In this patent specification:

(1) a "stream" is assumed to be composed of a stream header, containing information about the stream itself, followed by a series of packets, (2) each "packet" is assumed to consist of a packet header plus the actual data payload of the packet, (3) the generated random key used to create and deconstruct packet keys is called a "base key" but could also be termed a "session key", a "base stream key" or a "closed key", (4) both the packet header and data payload are assumed to consist of some number of entire bytes (octets), which numbers may vary from packet to packet, and (5) each packet header is assumed to include at least one item of information that uniquely identifies that packet, called here a "tag". An example could be a time position value indicating the packet's relative time offset from the stream start, or a serial number, or (x, y) co-ordinates pertaining to the intended destination or location of the packet data. The tag information, along with the rest of the packet header, must accompany a packet "in the clear", that is, not encrypted.

FIG. 1 shows diagrammatically the steps according to one embodiment of the present encryption system as applied by a sender of streaming media and the steps of decryption as applied by a recipient of the streaming media. This may be implemented in various manners as described below.

The encryption process essentially involves encrypting (6) the data in each streaming media packet with a packet key which is generated by computing a secure hash (5) of the packet tag value with a base key. To decrypt the encrypted packet data it is necessary for the recipient to be able to generate the packet key and in order to do this the recipient must be in possession of the base key. The base key generated (1) randomly by the sender is passed to the recipient after being asymmetrically encrypted (3) with the recipient's public key (2). The encrypted base key (open key) is transmitted to the recipient. It is convenient, although not necessary, to pass the open key to the recipient in the stream header as indicated in FIG. 1 by the dotted lines.

The packet encryption process commences with the extraction of tag data from incoming streaming media packets (or the creation of such tags if the packets do not contain tag data) and creating a packet key by computing a secure hash of the base key and the tag value. For each streamed media transmission or session, a base or session key (1) is randomly generated and is hashed (5) with the tag value of each streaming media packet to produce a packet key which is used to encrypt (6) (e.g., symmetrically) the data carried in the corresponding packet. Hash functions such as SHA-1 or MD5 are suitable for the hash computation. In one embodiment, packet data is encrypted using a symmetric algorithm, but other types of encryption algorithms could be used so long as the required minimum computation time is not exceeded. The encrypted packet data or ciphertext is then combined (7) with the unencrypted or open tag value for that packet. The process described is applied to each data packet in the stream to produce an encrypted packet stream which is transmitted to the recipient.

At the recipient's station the stream header is first received and the open key extracted from it unless the open key has already been received earlier by other means. The open key is then asymmetrically decrypted (12) using the recipient's private key 11. The decrypted open key, that is the base key, is ten available to the hash algorithm (14) to allow the packet key to be derived.

The tag values of each stream data packet are extracted (13) and then hashed (14) with the base key to produce the packet key for each packet. The stream packets with tag values removed (stream data) are then symmetrically decrypted (15) using the corresponding packet key. The plaintext stream packets, with or without tag values depending on the transmission protocol being used, are then stored or outputted in a form suitable for use by a streaming media player.

The present encryption processing may insert specific information into designated field(s) within the stream header, and also replaces the data payload of each packet with encrypted data. All of the packets in the stream are encrypted, but only the data payload is encrypted and not the packet header information. This remains unchanged by the encryption processing. The size in bytes of the encrypted data in a packet need not be larger than the size of the original (unencrypted) data payload.

In one embodiment, the encryption algorithm used to protect the base key prior to its transfer from sender to recipient is a public-key (asymmetric) algorithm in which the recipient's public key is used by the sender to encrypt the packet key and the corresponding private key is used by the recipient to decrypt it. The private keys used by the public key algorithm may contain protocol or formatting information in addition to key data bits. The number of key data bits (the key size) is scalable for different applications, based on security requirements, but at least 607 bit keys must be allowable. A specific application may permit only a single key size to be used, or may handle multiple key sizes.

A valid private key may include any specified (arbitrary or application-defined, or randomly generated) pattern of key data bits, although a limited number of data patterns may be excluded (for example, all zeros or all ones). Public keys should have the same number of key data bits as private keys, and a fast asymmetric algorithm is used to rapidly generate a public key from any valid private key, while at the same time it is computationally infeasible to ascertain the private key from which a particular public key has been generated.

When encrypting a stream using a particular public key, the encryption algorithm (3) may insert data comprising the open key into an appropriate-designated place within the stream header as shown by the dotted lines in FIG. 1, or alternatively the open key can be transmitted to the recipient at an earlier time as shown by the solid lines between encryption Stage 3 and decryption Stage 12. Upon receipt of the open key, a recipient who possesses the correct private key is able, using the decryption algorithm, to use the open key to establish or calculate information (a "closed key") known only to the sender and to the recipient(s).

The process of encrypting each packet's data depends upon (i.e., utilizes in an essential way) the closed key and the packet's tag information. It is computationally infeasible, without knowing the private key, to calculate or determine the closed key based upon knowledge of publicly accessible information such as the public key, open key, encrypted stream data, packet tags, etc.

The encryption processing should use true random data to ensure that the closed key created for encrypting any stream varies randomly even if the same stream is encrypted on multiple occasions. The encryption algorithm ensures that even if two packets of data in the original stream contain identical data bits, the encrypted data for the packets is different. The encryption processing also ensures that if a stream is encrypted on multiple occasions, the encrypted packet data and the open key are different on each occasion.

The decryption processing is such that each intact packet that is received can be correctly decrypted, even if some packets are not received, or if some or all packets are received in a different order from the order in which they were sent.

In use a content owner of the streamed audio visual works will be provided with software which performs the encryption process as and when content is distributed. The software input will take the form of a packetized, compressed and encoded file. For example if the stream was to be played by a recipient using a Real player the file would use Real coding. Standard compression algorithms such as MPEG2 or MPEG4 would be used. In the case of a Real encoded file the tag value, which is an essential part of the present encryption system, would be the Real timeline value. This is a measure of time from when the stream starts.

Users will have received decryption software in advance from the content provider direct, by downloading from a website or bundled with the streaming player software. A typical business model for deployment of the present encryption software would be for content providers to be licensed for value with users being provided with the decryption software component free of charge. Users would pay the content provider for only the content itself. On payment (or equivalent) for the content the user would be provided with the open key corresponding to the requested content.

A system of media key management and distribution suitable for use in conjunction with the present encryption system is disclosed in applicant's New Zealand patent application 509037.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. A method of transmitting streaming media securely at a packet level, the streaming media comprising a plurality of data packets, the method comprising:
generating a base key;
creating, with a computer, a plurality of packet keys comprising a corresponding packet key for each data packet of the streaming media by hashing the base key with a unique packet tag assigned to the data packet;
encrypting, with the computer, each data packet using the corresponding packet key;
encrypting, with the computer, the base key, thus creating an open key;
transmitting the open key to a recipient; and
transmitting, in a transmission separate from the transmission of the open key, the encrypted data packets and the unique packet tags to the recipient, the open key being for decryption to obtain the base key and subsequent hashing with the unique packet tags by the recipient to create the plurality of packet keys for decrypting the encrypted data packets.

2. The method of claim 1, wherein the open key is transmitted by adding it to a stream header.

3. The method of claim 1, wherein the base key is encrypted using a public key encryption algorithm.

4. The method of claim 1, wherein the encrypted data packets are encrypted using a symmetric encryption algorithm in conjunction with the plurality of packet keys.

5. The method of claim 1, wherein the corresponding packet key for each data packet of the streaming media is based on a secure hash of the base key and the unique packet tag assigned to the data packet.

6. The method of claim 5, wherein the secure hash is based on a SHA-1 or MD5 hash.

7. A method of receiving streaming media encrypted at a packet level, the method comprising:
receiving, in a first transmission, an encrypted packet stream relating to a streaming media, the encrypted packet stream comprising a plurality of packets, each packet comprising encrypted packet information and a unique packet tag, wherein the packet information is encrypted with a packet key created by hashing a base key with the unique packet tag;
extracting the unique packet tag from each packet;
receiving, in a second transmission, an encrypted base key;
decrypting, with a computer, the encrypted base key;
computing, with a computer, a plurality of packet keys comprising a corresponding unique packet key for each packet by hashing the unique packet tag of each packet with the decrypted base key; and
decrypting, with the computer, the packet information of each packet using the corresponding unique packet key for each packet.

8. The method of claim 7, wherein the base key is decrypted using a public key encryption algorithm.

9. The method of claim 7, wherein the computation of the corresponding unique packet key for each packet is based on a secure hash of the decrypted base key and unique tag value of each packet.

10. The method of claim 9, wherein the secure hash is based on a SHA-1 or MD5 hash function.

11. A non-transitory computer readable medium storing computer-executable program instructions for transmitting streaming media securely at the packet level, the streaming media comprising a plurality of data packets, the computer-executable program instructions comprising instructions for:
generating a base key;
creating a plurality of packet keys comprising a corresponding packet key for each data packet of the streaming media by hashing the base key with a unique packet tag assigned to the data packet;
encrypting each data packet using the corresponding packet key;
encrypting the base key, thus creating an open key;
transmitting the open key to a recipient; and
transmitting, in a transmission separate from the transmission of the open key, the encrypted data packets and the unique packet tags to a recipient, the open key being for decryption to obtain the base key and subsequent hashing with the unique packet tags by the recipient to create the plurality of packet keys for decrypting the encrypted data packets.

12. The method of claim 1, wherein the streaming media comprising a one or more digital media files, each digital media file comprising a plurality of packets.

13. The method of claim 1, wherein the encrypted data packets are transmitted over the internet.

* * * * *